Figure 1:
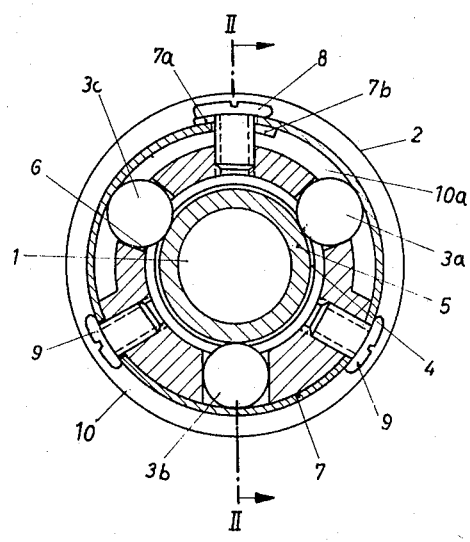

Jan. 10, 1967   E. SCHWEITZER   3,296,888

APPARATUS FOR STEP-DRIVING

Filed Jan. 14, 1965

INVENTOR.
EUGEN SCHWEITZER
BY
Woodhams, Blanchard & Flynn
ATTORNEYS

United States Patent Office 3,296,888
Patented Jan. 10, 1967

3,296,888
APPARATUS FOR STEP-DRIVING
Eugen Schweitzer, Munich, Germany, assignor to Movit Industrieanstalt, Schaan, Liechtenstein, a corporation of Liechtenstein
Filed Jan. 14, 1965, Ser. No. 425,541
Claims priority, application Germany, Jan. 30, 1964, M 59,742
7 Claims. (Cl. 74—574)

The invention relates to apparatus applicable to step drive means, especially step motors, for damping the oscillation thereof around a position of rest consisting of an annular load mass mounted rotatably on a driven shaft and a braking apparatus which retards the movement of the load mass relative to the shaft. In step drive devices, especially those where a rotor is driven stepwise by changing magnetic fields and is held magnetically between steps in a position of rest, there exists the problem that the rotor because of its own moment of inertia and the moment of inertia of the driven parts does not come immediately to a standstill at the position of rest but oscillates for some time around such position of rest. This can, especially in cases of high step frequencies, lead to operational failures.

In previously known apparatus of the type referred to above, the load mass constitutes a housing mounted rotatably on the shaft bearing the rotor. The housing contains two compartment forming chambers lying radially opposite each other. A vane is mounted in the shaft which vane projects into both chambers. The housing is connected with a shaft through a helical spring which urges said housing into such position that the vane lies in the middle of each of said chambers. When the shaft is braked to its rest position, the housing rotates further in consequence of its moment of inertia and this further rotation is opposed primarily by the compression of air in the chambers by means of the vanes and additionally by the increasing spring tension. A corresponding operation occurs upon the reverse movement of the housing. The brake mechanism is accordingly in the previously known apparatus constructed as an air brake. This, however, is disadvantageous in that an air brake requires a very exacting fitting of the vanes with respect to the chambers in order to obtain an effective braking action with a minimum of air volume. The edges of the vanes must bear against the chamber walls with a minimum of clearance in order to restrict the flow of air past the vanes. The narrow tolerances, thereby required, lead to high manufacturing costs. Further, it has been shown that a known apparatus after only a relatively short period of operation alters or entirely loses its damping effectiveness because the vanes begin to rub on the housing walls or lock within the housings. A further disadvantage of known apparatus consists in that the spring connected with the shaft actually works against the desired damping.

The purpose of the invention is to provide apparatus of the above-described type such that by simple and inexpensive construction an effective and uniform damping operation can be provided over a long period of operating time. This can be accomplished according to the invention by supporting an inertia member on three bearings, for example balls, arranged in equal angular spacings on a suitable raceway located on or associated with the shaft, the bearings being radially spring tensioned for the development of the necessary frictional braking force.

In an apparatus according to the invention, the braking operation is obtained by friction between the inertia or load mass and the shaft. This friction is held at a uniform but substantial magnitude because, on the one hand, the wearing which occurs between the bearings and the raceway, the latter being preferably hardened, is extremely minor and, on the other hand, the wear which eventually does occur is equalized through the spring tension acting on the bearings. In this manner, the small loss of tension occurring because of the equalization of wear, does not lead to any alteration worth mentioning of the contact pressure between the bearing and the shaft. The apparatus according to the invention is further not expensive to manufacture since it uses commercial bearings and the tolerances remain at an ordinary value.

The attainable braking moment depends, on the one hand, on the moment of inertia of the inertia mass and, on the other hand, on the friction translatable to the bearing. Through appropriate choosing of these two oppositely directed parameters, the damping is readily conformed to actual requirements. Since the braking moment of the apparatus responds to the running of the step motor, it operates only to the extent necessary for the damping of the undesired oscillations around the at rest position at the end of a given step. In this manner, not only can the oscillation of the rotor and its axle in an idling condition be damped, but more importantly it is also possible to damp by a desired amount of oscillations of the mechanism when in a loaded condition, such amount being determined by the moment of inertia of the driven parts and the translation elements. With a given inertia mass, the obtaining of a given damping effectiveness will very precisely depend upon the amount of friction between the inertia mass and the shaft. This is, in the apparatus according to the invention, possible on account of the statically determined three-point support of the inertia mass on the shaft. The apparatus according to the invention has the particular advantage that it can serve as the calibration value for the step mechanism. By the firm holding of the inertia mass, there is developed through the friction an entirely uniform braking moment which is independent of the resonance characteristics of any of the parts. This has not been possible up to now.

According to a preferred embodiment of the invention, the magnitude of the spring tension is adjustable. The desired friction can be selected during the process of assembly at a desired value whereby any ordinary production standards can be obtained without difficulty. The adjustability of the spring tension has the further advantage that subsequent regulation of the friction after a period of operation is possible in case this appears necessary.

Figure 2:
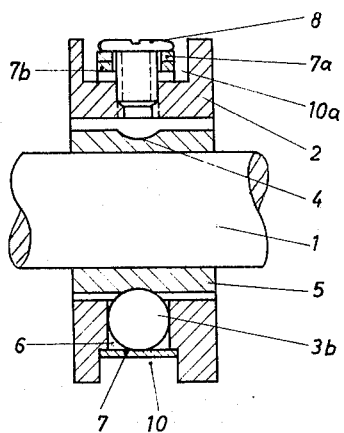

Further features and advantages of the invention will appear in the following description of the illustrative examples taken in connection with the drawings. The drawings show:

(1) In FIGURE 1, a cross section through apparatus according to the invention; and
(2) In FIGURE 2, a vertical section through the apparatus of FIGURE 1 corresponding to the reference line II—II.

In the drawing, a shaft 1 is rotatably driveable stepwise by a step motor, not shown. On the shaft 1 there is rotatably mounted an annular load working mass 2 and there is provided a braking apparatus hereinafter described which retards the rotation of the working mass 2 with respect to the shaft 1.

According to the invention the annular working mass 2 is supported on three bearings 3a, 3b and 3c, which are urged by suitable spring pressure radially against a bearing race 4 fixed nonrotatably with respect to the shaft.

The bearings 3a–c are arranged in equal angular spacings of 120 degrees from each other.

In the illustrated embodiment, balls are utilized as the bearing bodies. The race 4 is provided in a collar 5 connected nonrotatably by any convenient means not shown with the shaft 1 and hardened. The race 4 can, however, be equally well provided in the shaft itself. In the preferred embodiment illustrated in the drawings, the bearing bodies are arranged in radial openings to extend through the annular working mass 2. For the embodiment of the bearing bodies as balls, said openings are provided simply as radial bores 6. The balls 3a–c are radially moveable in the bores 6. The afore-mentioned spring pressure is developed by a circular or ring-shaped spring 7 surrounding the balls. Said ring-shaped spring 7 is, in the illustrated preferred embodiment of the invention, constructed as an annularly shaped leaf spring 7. The ends 7a and 7b of the circular spring 7 are at their passing point freely slideable with respect to each other and radially distortable. An adjusting screw 8 is threadedly inserted at said point into the annular working mass 2, for adjustably controlling the tension of the circular spring 7. In the particular embodiment shown, the ends 7a and 7b are slotted for snugly but slideably engaging the shank of the screw 8. The circular spring 7 is connected fixedly with the load mass 2 at at least one point. In the illustrated embodiment there are provided for this purpose two fastening screws 9 which connect the circular spring 7 between the balls 3b and 3c on the one side and between the balls 3b and 3a on the other side fixedly with the load mass 2. The spring 7 lies accordingly in a circumferential groove 10 of the load mass 2, said groove 10 being deepened at 10a in the region between the balls 3a and 3c together with a portion extending beyond said balls. Accordingly, the leaf spring 7 is freely deflectable in the region 10a while the remaining circumference of the load mass lies fixedly on the bottom of the groove.

The device according to the invention operates as follows:

After fastening of the apparatus to the shaft 1, the tension of the spring 7 is adjusted by appropriate rotation of the adjusting screw 8 in order that the desired friction will be imposed onto the surface of the bearings 3a–c upon the occurrence of a given moment of inertia of the load mass 2. If the shaft is now driven, the load mass 2 at first lags and is then accelerated through the frictional force applied thereto. At the end of the step, the shaft 1 is braked while the load mass 2 continues its movement and exerts a rotative moment through the balls onto the shaft 1 and tends to move said shaft beyond its position of rest. If the shaft now tends to oscillate back beyond the position of rest, it is impeded from doing so by the moment developed by the load mass 2. The oscillating energy of the shaft will in this manner be dissipated through such friction.

The invention is not limited to the illustrated embodiment. Especially, the bearing race 4 can as noted above be provided directly in the shaft 1. Further, it is possible, in place of the ball-shaped bearing bodies, to use also roller or needle bearings. Further, it will be recognized that the leaf spring 7 consisting of spring steel may be fastened at one place to the load mass 2 between the two balls. The shape of the load mass is somewhat a matter of choice. Especially, is it possible to modify the illustrated embodiment to compensate for the unbalance caused by the deepening of the groove 10 at 10a by a corresponding extra mass in the region of the deepening 10a.

All of the above-described features appearing in the description and drawings including construction details can also be carried out in various other combinations within the scope of the invention.

The embodiments of the invention in which an exclusive property or privilege is claimed are defined as follows:

1. In step drive means, especially stepping motors, apparatus for damping oscillations of the driven member, comprising:
   a driven shaft adapted to be driven by said step drive means;
   an annular load mass mounted for rotation with respect to said driven shaft;
   brake means for retarding rotational movement of said load mass relative to said driven shaft, said brake means including three rigid rolling bearing elements coupled to one of said load mass and said driving shaft for rotation therewith, the other one of said driven shaft and said load mass having an annular bearing race thereon in which said bearing elements are received for rolling movement therealong, and resilient means for resiliently urging said bearing elements radially toward the other one of said driven shaft and said load mass in order to apply a friction braking force between said driven shaft and said load mass.

2. Apparatus according to claim 1, including means for adjusting the magnitude of the force applied by said resilient means.

3. Apparatus according to claim 1, in which said bearing race is hardened.

4. In step drive means, especially stepping motors, apparatus for damping oscillations of the driven member, comprising:
   a driven shaft adapted to be driven by said step drive means, said driven shaft having a bearing race fixed with respect thereto;
   an annular load mass surrounding said driven shaft and mounted for rotation with respect thereto, said load mass having three circumferentially spaced openings therethrough;
   brake means for retarding rotational movement of said load mass relative to said driven shaft, said brake means including three rigid rolling bearing elements each of which is disposed in one of said openings in said annular load mass for radial movement therein, said bearing elements being received in said bearing race for rolling movement therealong, and an annular spring surrounding said load mass in the region of said openings and bearing on the radially outermost points on said rolling bearing elements for resiliently urging said bearing elements radially inwardly in order to apply a friction braking force between said driven shaft and said load mass.

5. In step drive means, especially stepping motors, apparatus for damping oscillations of the driven member, comprising:
   a driven shaft adapted to be driven by said step drive means, said driven shaft having a bearing race fixed with respect thereto;
   an annular load mass surrounding said driven shaft and mounted for rotation with respect thereto, said load mass having three circumferentially spaced openings therethrough;
   brake means for retarding rotational movement of said load mass relative to said driven shaft, said brake means including three rigid rolling bearing elements each of which is disposed in one of said openings in said annular load mass for radial movement therein, said bearing elements being received in said bearing race for rolling movement therealong, a circularly shaped leaf spring surrounding said load mass in the region of said openings and bearing on the radially outermost points on said rolling bearing elements for resiliently urging said bearing elements radially inwardly in order to apply a friction braking force between said driven shaft and said annular load mass, said leaf spring being fixedly connected to said load mass at at least one position between two adjacent bearing elements, said leaf spring also having relatively movable overlapped ends located between two adjacent bearing elements, and an adjusting screw for releasably clamping the overlapped ends of the spring together, the adjusting screw being releasable for adjustment of the spring tension.

6. Apparatus according to claim 5, in which the said annular load mass has a circumferential groove, said leaf spring being disposed in the bottom of said groove, said spring being secured to said load mass at two positions on opposite sides of a given bearing element, said groove being of increased depth in the region between the other two bearing elements, said adjusting screw being threadedly engaged in said load mass in said region.

7. Apparatus for a step drive motor for damping oscillation of the shaft thereof about a rest position, comprising in combination: a collar for mounting fixedly on said shaft, said collar having an annular race in the periphery thereof; an annular load mass loosely surrounding said collar, said annular load mass having three evenly spaced radial holes therethrough; a bearing ball at least radially moveable in each of said openings and in rolling contact with said raceway; a circularly shaped leaf spring surrounding said annular load mass for contacting said bearing balls and retaining same within said load mass, said leaf spring having overlapped, freely relatively moveable ends, and means for fixing said leaf spring between the ends thereof to said annular load mass between a first pair of said bearing balls; an adjusting screw radially threaded into said annular load mass between a second pair of said bearing balls, said adjusting screw engaging said ends to said leaf spring for adjusting the spring tension thereof, said annular load mass including a circumferential groove in which said leaf spring is disposed, said annular groove being deepened at least in the region between said second pair of bearing balls; whereby tightening of said screw causes said leaf spring to force said balls radially against said race to frictionally retard movement of said load mass with respect to the said shaft.

References Cited by the Examiner

UNITED STATES PATENTS

| 764,356 | 7/1904 | Hayden | 74—574 |
| 2,882,704 | 4/1959 | Quackenbush | 64—29 |

FRED C. MATTERN, Jr., *Primary Examiner.*

W. S. RATLIFF, *Assistant Examiner.*